United States Patent [19]

Haese et al.

[11] 4,083,695
[45] Apr. 11, 1978

[54] TUBULAR REACTOR FOR ENDOTHERMIC CHEMICAL REACTIONS

[75] Inventors: Egon Haese; Albert Kellermann, both of Bochum, Germany

[73] Assignee: Dr. C. Otto & Comp. G.m.b.H., Bochum, Germany

[21] Appl. No.: 738,829

[22] Filed: Nov. 4, 1976

[30] Foreign Application Priority Data

Nov. 11, 1975 Germany .......................... 2550565

[51] Int. Cl.² .................................................. B01J 8/06
[52] U.S. Cl. .................................... 23/289; 23/288 M; 176/37; 165/162; 165/142; 165/172; 122/510
[58] Field of Search ............. 23/288 M, 289; 165/162, 165/142, 172

[56] References Cited

U.S. PATENT DOCUMENTS

| | | | |
|---|---|---|---|
| 1,815,750 | 7/1931 | Watts | 165/162 X |
| 3,870,476 | 3/1975 | Marsch | 23/289 |
| 3,980,440 | 9/1976 | Morse et al. | 23/288 M |

Primary Examiner—James H. Tayman, Jr.
Attorney, Agent, or Firm—Thomas H. Murray

[57] ABSTRACT

A tube-type reactor includes a reactor shell surrounding a bundle of vertically-arranged jacketed tube assemblies. An equilateral triangle is formed by lines interconnecting the central axes of the three jacketed tube assemblies in mutual contact. Each jacketed tube assembly includes a reactor tube forming an annular space within a sheathing tube which includes six longitudinally-arranged slots uniformly distributed about its top end and into which connecting elements are received and welded to join together the sheathing tubes. In one form, the connector element includes spacer heads extending along a web to lie within the annular gap between the reactor tube and the sheathing tube and abut against the reactor tube. In a second embodiment, the connector element includes a web having three spider arms with longitudinal recesses, the width of which corresponds to the wall thickness of a sheathing tube.

10 Claims, 5 Drawing Figures

TUBULAR REACTOR FOR ENDOTHERMIC CHEMICAL REACTIONS

BACKGROUND OF THE INVENTION

This invention relates to a tubular reactor of the type adapted to receive a pressurized gaseous medium at a temperature within the range of approximately 600° and 1000° C after heating in a nuclear reactor for carrying out an endothermic chemical reaction. More particularly, the present invention relates to such a tubular reactor for cracking hydrocarbons with water vapor to generate gases which contain CO, $H_2$, $CH_4$ and $CO_2$ by utilizing the sensible heat of hot gases, particularly a rare gas, such as helium, under a pressure within the range of 10 to 100 bars after heating as aforesaid in a nuclear reactor to thereby meet the heat requirements to carry out the endothermic reaction.

It is known in the art to conduct a heated gas through an insulated pressure vessel having suspended therein reaction tubes which are usually filled with a catalyst. Such reaction tubes undergo substantial elongation when heated from a cold state up to an operating temperature. The reaction tubes are, therefore, provided in the form of jacketed tubes, each comprising an outer reaction tube and an internally-disposed return tube in which the entry of the gas mixture for the reaction and the exit of the reaction gas are situated on one side. The gas mixture for the reaction flows upwardly in an annular space, usually filled with a catalyst, between the outer reaction tube and the inner return tube. The reaction is completed at the bottom of the annular chamber and the reaction gas is discharged upwardly from the reaction tube through the return tube. The sensible heat delivered by the gas for example, helium, flows around the reaction tube in an upward direction which is countercurrent to the flow of the reaction mixture. By this relation, the top point of the reaction tube is situated in the relatively cool part of the helium flow and, therefore, can be constructed as the fixed point. The tubes are allowed to expend freely in the downward direction, thus facilitating the use of means for passing the pigtails from the reaction tube through the wall of the pressure vessel.

Since there is no substantial radiation properties to the heat-delivering gas, it follows that heat is transmitted to the reaction tubes predominantly by convection. Several proposals have been suggested to achieve optimum heat transfer coefficients at the heating side of the vessel.

Deflection plates, sometimes called baffles, of the type conventionally employed in heat exchangers to achieve a crossflow of helium, have also been used for gas-heated reaction tubes. The use of baffles requires an additional arrangement of support tubes on which the deflection plates are mounted. Moreover, the minimum distance between the reaction tubes is limited by the factors relating to mechanical strength and manufacturing processes which bring about a requirement to retain a sufficiently wide web between the individual bores. These factors and the additional requirement for support tubes have brought about the need to employ very large diameter pressure vessel only at high cost. A further disadvantage of these known constructions resides in the relative motion occurring between the reaction tubes and the baffles as a result of heating and cooling and which can initiate vibrations in the system. It is, therefore, possible for the pressurized reaction tubes to be destroyed at the point of contact between the reaction tubes and the deflection plates.

In another known arrangement wherein the heat-delivering gas flows through an annular gap in an axial direction with respect to the reaction tube, a block of carbon or sintered, high-purity alumina of a length corresponding to the active length of the reaction tubes, in inserted into the interior of the pressure vessel. The block, made of individual layers, is drilled axially with respect to the pressure vessel so that after insertion of the reaction tubes into the drilled openings, an annular gap is formed for the flow of the heatdelivering gas. Since a web must be retained between the bores drilled in the block, a minimum distance of 170 millimeters will be obtained with the materials in use, for example, in the case of a reaction tube with an external diameter of 120 millimeters. A further reduction to the pitch between tubes is, therefore, not possible.

It is also known in the art to employ a support plate for the top ends of the reaction tubes. The support plate includes longitudinal bores with a diameter corresponding to the diameter of the reaction tubes which are inserted into the bores and secured to the plate by welding. The support plate is relatively thick to provide the required mechanical strength and necessary guiding for the reaction tubes. Moreover, the tubes in the bore can only be secured by welding from the top. A reduction to the distance between the tubes is not possible particularly in relation to the last-mentioned construction.

SUMMARY OF THE INVENTION

It is an object of the present invention to provide an improved construction and arrangement of parts that will avoid the disadvantages heretofore enumerated in regard to known tube-type reactor constructions.

It is still another object of the present invention to provide a connecting element welded to mutually-contacting sheathing tubes while extending along a slot in each such sheathing tube so that a face surface of the connecting element projects into an annular gap formed within the sheathing tube by a reaction tube extending in an axial direction therealong, thereby forming jacketed tube assemblies which are arranged vertically within a reactor shell.

In accordance with the present invention, there is provided a tubular reactor receiving a pressurized gaseous medium at a temperature within the range of approximately 600° and 1000° C after heating in a nuclear reactor for carrying out an endothermic chemical reaction, the tubular reactor including the combination of a reactor shell including a layer of insulation disposed within the shell, a plurality of jacketed tube assemblies extending vertically within the reactor shell in a bundle formation with mutually-contacting top portions thereof being arranged such that an equilateral triangle is defined by lines interconnecting the central axes of three jacketed tube assemblies in mutual contact, each jacketed tube assembly including a sheathing tube and a reactor tube disposed within the sheathing tube to define an annular gap therebetween for conducting the gaseous medium upwardly within the annular gap, each sheathing tube having six longitudinally-arranged slots uniformly distributed about the top end thereof, and a connecting element welded to mutually-contacting sheathing tubes while extending along a slot in each sheathing tube, the connecting element having a face surface projecting into the annular gap between the sheathing tube and the reaction tube to bear against the reaction tube.

By this construction and arrangement of parts, the sheathing tubes take the form of a support structure to provide a minimum tube spacing. Thus, reactor tubes having an external diameter of, for example, 120 millimeters, the tube spacing measured between the centers of two adjacent tubes, is less than 150 millimeters. In a tube reactor contacting 300 or more tubes, this arrangement provides a substantial reduction to the diameter of the pressure vessel as compared with known support arrangements for tubes.

The present invention further provides that the sheathing tubes, combined into a bundle, are retained together at their top ends by a support ring which surrounds the bundle of sheathing tubes. The support ring is fixedly joined to those tubes situated on the exterior bundle while the support ring includes a support surface to provide the means by which it is, in turn, supported upon a shoulder which is provided on the internal arrangement of insulation within the reactor shell.

According to one embodiment of the present invention, the slots in the sheathing tubes are located at the points of contact between the sheathing tubes. The connecting elements each has a web having a rectangular cross section and provided on both sides along the length thereof with a centrally-arranged recess having a width corresponding to twice the wall thickness of a sheathing tube. The connecting elements include reinforced sections in the form of spacer heads employed for centering a reaction tube within a sheathing tube.

According to another embodiment of the present invention, the slots in the sheathing tubes are situated midway between the points of mutual contact between sheathing tubes. The connecting elements each includes a web having a threearmed spider section. Both opposed sides of each spider arm are provided with a recess which extends along the length of the spider arm and defines a width corresponding to the wall thickness of a sheathing tube. A reinforcing end section on each spider arm forms a spacer head by which a reaction tube is centered within a sheathing tube.

In reactors of the kind described hereinbefore, it is possible, although rarely, for leaks to occur in the reaction tubes, for example, due to faults in the material or due to other influences. In the event of such leaks, it is the practice to shut down operation of the faulty tube by disconnecting the pigtails associated with the reaction tube from outside the pressure vessel. The affected individual sheathing tube will then assume a temperature which is higher than that of the other tubes because heat is not dissipated from the heat-delivering gas, for example, helium. It is, therefore, necessary to prevent direct contact beneath the connecting elements between sheathing tubes because the points of contact between adjacent sheathing tubes would then also transfer heat between them by conduction whereby excessive temperatures develop giving rise to the risk of the tubes bending. To avoid this defect, the present invention provides that the external diameter of the sheathing tubes beneath the connecting elements is less than the diameter of the sheathing tubes at their top region where the connecting pieces are located between mutually-contacting sheathing tubes. To compensate for manufacturing tolerances when the bundle of sheathing tubes is assembled, the bottom region of the sheathing tube is provided with spacers which are in contact with the sheathing tubes. Each spacer is attached to a sheathing tube by tack-welding. In this way, the tubes are spaced from each other without impeding the longitudinal thermal expansion. It is desirable to arrange the spacers between the various tubes in a vertically-staggered pattern.

When the sheathing tubes are assembled into a bundle formation, a free space is created between the tubes which would normally permit the flow of the heat-delivering helium. Such a gas delivery flow is prevented by the present invention wherein the free space between the sheathing tubes is closed in a gas-tight manner above the connecting elements by thin sheet metal gussets which are welded in position.

According to a further feature of the present invention, triangular claws are mounted upon a reaction tube at the place where the tube projects beyond the top end of the sheathing tubes. The claws are arranged to bear upon the top ends of the sheathing tubes to locate the position of the reaction tubes.

These features and advantages of the present invention as well as others will be more fully understood when the following description is read in light of the accompanying drawings, in which.

Figure 1:
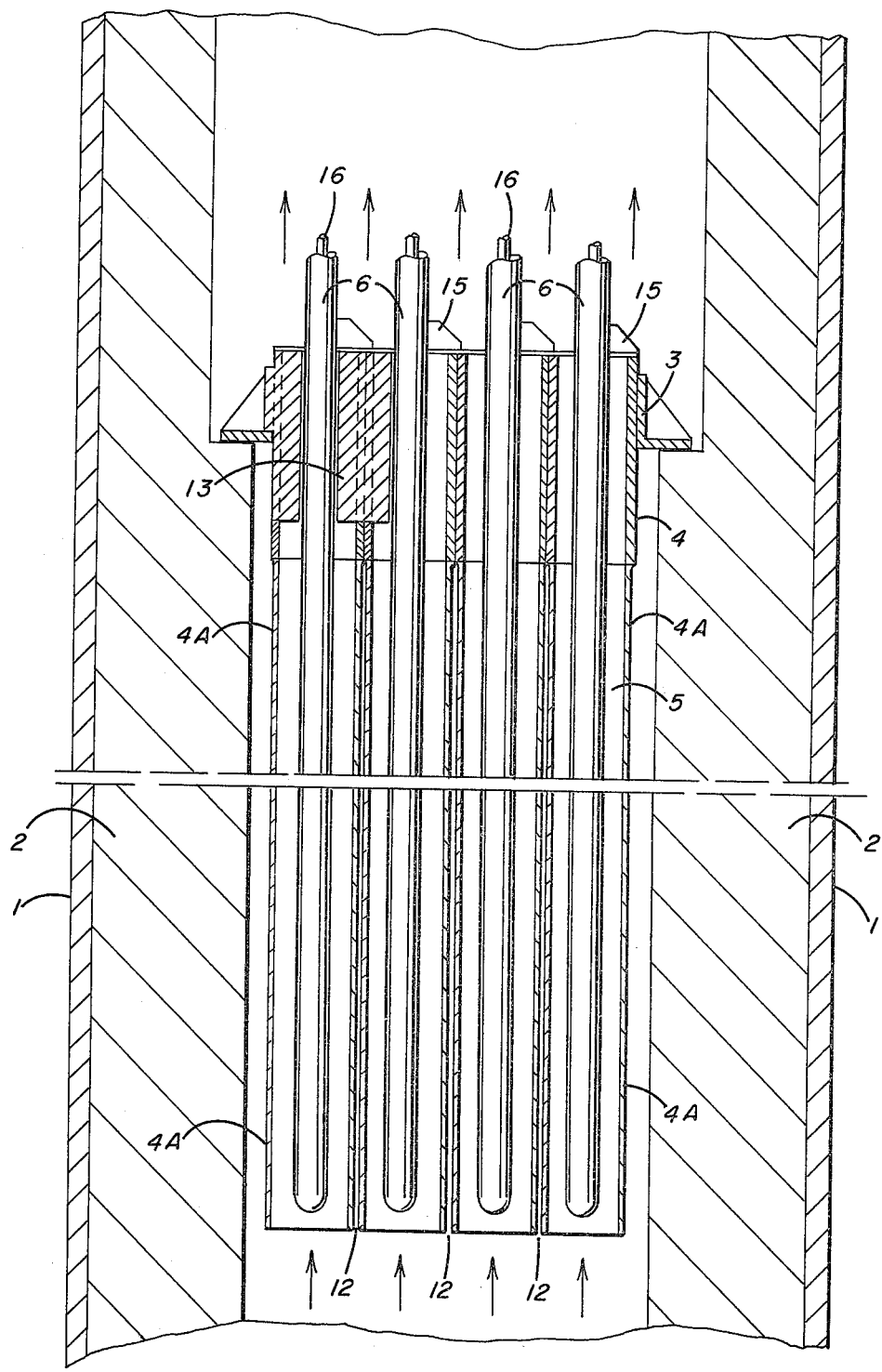
FIG. 1 is an elevational view, in cross section, through a tube-type reactor embodying the features of the present invention.

In FIG. 1, there is illustrated a tube-type reactor which includes a pressure shell 1 having a layer in insulation disposed entirely about the shell. The top section of the insulation defines a shoulder having a step-like form. A support ring 3 which is angular in cross section includes a horizontal flange to bear against the shoulder defined by the insulation. The support ring surrounds the top ends of the sheathing tubes whereby they are combined into a bundle formation. The sheathing tubes are open at their bottoms. A reaction tube 6 is inserted into each of the sheathing tubes 4 whereby an annular gap 5 is defined between the tubes 4 and 6. The reaction tubes are closed at their bottoms and contain return tubes 16 which are open at the bottom and also form an annular space wherein a catalytic mass is disposed, if desired. The gas mixture for cracking by the endothermic chemical reaction is fed at the top ends into the annular space within the reaction tubes 6. The gas mixture flows along the annular spaces downwardly and then enters the return tubes. The gas is withdrawn at the top ends of the tubes 16. Heating is obtained, for example, by using helium which has the necessary temperature of about 600° to 1000° C after being heated in a nuclear reactor. The helium flows upwardly along the annular gaps 5. The various ducts for supplying the gas mixture which is to be cracked, as well as the discharge ducts for the cracked gas and helium gas are not shown in FIG. 1 in the interest of clarity.

Claws 15, with a triangular shape as seen from the side, bear upon the top ends of the sheathing tubes and are fixedly mounted onto the reaction tubes 6 at the portions projecting above the terminal ends of the sheathing tubes.

Figure 2:
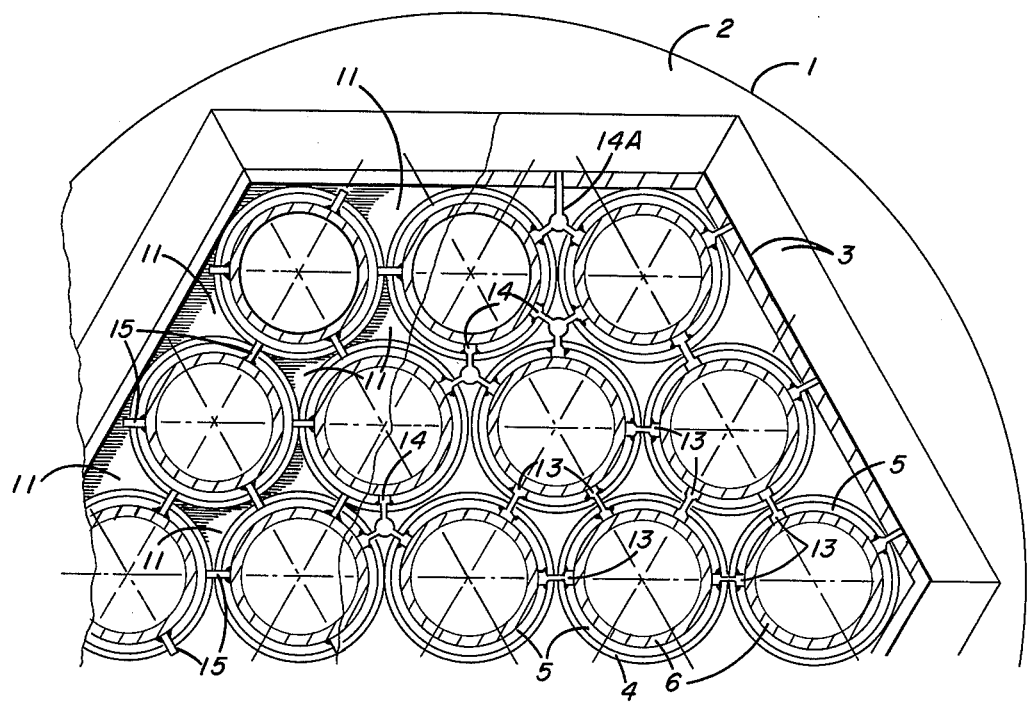
FIG. 2 is a plan view, partly in section.

In FIG. 2, there is illustrated in diagrammatic form, the arrangement of the various tubes within the reactor shell. The left-hand portion of the illustration in FIG. 2 is a plan view; while the right-hand portion represents a sectional view at a lower elevation. As can be clearly seen in FIG. 2, the shell 1 of the reactor contains the internal layer of insulation 2 providing the aforementioned stepped shoulder upon which the horizontal flange of the support ring is carried. The support ring in the illustrated embodiment has a hexagonal form. The sheathing tubes 4 are arranged in a bundle formation within the support ring 3 so that the tubes touch each other in a mutually-contacting relation at their upper ends. Imaginary lines extending between the central axes of three sheathing tubes in mutual contact define an equilateral triangle. It is thus apparent that a plurality of reaction tube assemblies are arranged in a bundle formation wherein the reaction tubes 6 are disposed concentrically with respect to the sheathing tubes 4 while defining an annular gap 5 within the sheathing tubes. Support claws 15 (left-hand portion of FIG. 2), are welded onto the reaction tubes 6. The claws 15 are, in turn, mounted upon the top ends of the sheathing tubes. The return tubes 16 are not shown in FIG. 2.

Figure 3:
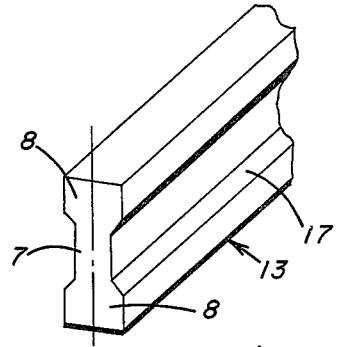
FIG. 3 illustrates one embodiment of connecting elements forming part of the present invention.
Figure 5:
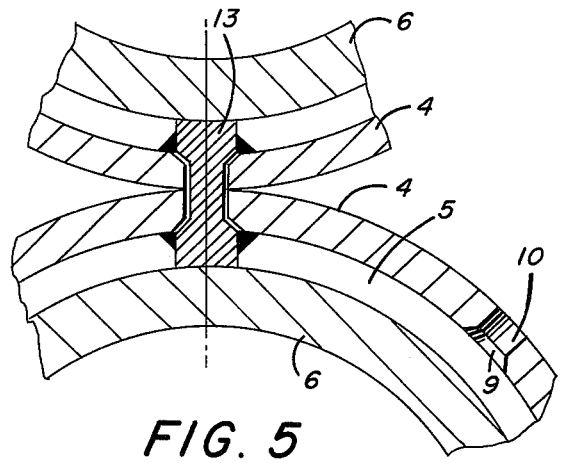
FIG. 5 is an enlarged view illustrating the use of a connecting element shown in FIG. 3 for joining together two mutually-contacting sheathing tubes.
Figure 4:
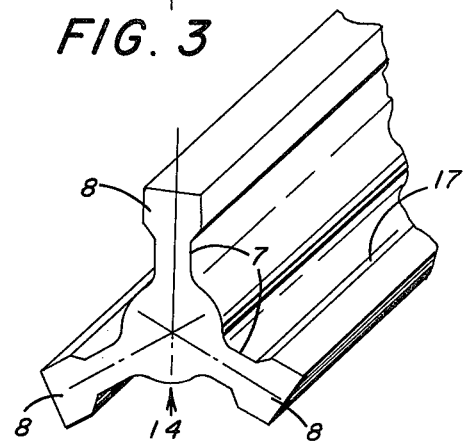
FIG. 4 illustrates a further embodiment of a connecting element according to the present invention.

The triangular spaces between the sheathing tubes as well as the triangular spaces between the support ring and the sheathing tubes disposed externally about the bundle are closed in a gas-tight manner by thin sheet metal gussets 11 which are welded in position. The connection between the individual sheathing tubes is provided by employing connecting members, two forms of which are illustrated in FIGS. 3 and 4. When connecting members 13, shown in FIG. 3, are employed, the sheathing tubes 4 are slotted over the upper part of their length at the fixed points of mutual contact with surrounding tubes. The slots are uniformly distributed about the circumference of the sheathing tube and the connecting elements are positioned into the slot from above. As shown in FIG. 3, the connecting members 13 embody a construction such that along the length of the connecting member, both sides thereof are provided with a central recess so that, in cross section, the connecting member has the appearance of a reduced middle portion 7 and two outer reinforced portions which define spacer heads 8. The width of the recess portions corresponds to twice the wall thickness of the sheathing tubes which are to be joined together by the connecting member. The transitions from the middle, thin portion to the spacer heads can be constructed so as to define sloping surfaces 17. In this event, the slots 10, in the upper ends of the sheathing tubes, are also provided with sloping surfaces 9 at the appropriate places which is indicated in FIG. 5. To connect two sheathing tubes together, a connecting element 13 is inserted into the slots 10 from above into a position as shown in FIG. 5 where the connecting element is retained in place by heads of weld at the places indicated. As shown in FIGS. 2 and 5, the spacer heads 8 define face surfaces which bear upon the outer surface of the reaction tubes 6. The spacer heads, therefore, function to center the reaction tubes with respect to a sheathing tube of each jacketed tube assembly.

FIG. 4 illustrates a further embodiment of a connecting element which comprises a web with a three-armed spider section with the individual spider arms being constructed in an identical manner and substantially as previously described in regard to FIG. 3, namely, the arrangement of the reduced portion 7 and the spacer head 8 which is enlarged with respect to the reduced portion 7. More specifically, the connecting element 14 shown in FIG. 4 includes a central web having three spider arms 7 each carrying a spacer head 8. Both sides of each spider arm include a longitudinal recess defining a width corresponding to the wall thickness of a sheathing tube. The sheathing tubes are interconnected to provide the bundle formation by using the connecting element 14 in a manner analogous to that previously described in regard to FIG. 3. However, when the connecting elements 14 are employed, the six slots in the upper ends of the sheathing tubes are not situated at the points of mutual contact between the sheathing tubes but, instead, the slots are located midway between the points of mutual contact between the tubes so that the connecting elements 14 are situated in the space surrounded by the three sheathing tubes in mutual contact. As can be seen in FIG. 2, the sheathing tubes are connected to the support ring 3 by a connector element 14A which is constructed in a manner similar to that already described in regard to FIG. 4 except that one spider arm is lengthened to extend to the support ring 3.

For the reasons hereinbefore described, the sheathing tubes 4 have reduced diameter portions 4A along the length thereof below the mounting places. Spacer gussets 12 are attached to each tube by tack-welding so as not to impair the longitudinal expansion of the tubes. The gussets 12 are employed to prevent bending and mutual contact between the tubes under certain conditions. The spacer gussets 12 are constructed in the same manner as gussets 11 which are provided at the top of the tubes to form a seal.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A tubular reactor receiving a pressurized gaseous medium at a temperature within the range of approximately 600° and 1000° C after heating in a nuclear reactor for carrying out an endothermic chemical reaction, said tubular reactor including the combination of:

a reactor shell including a layer of insulation disposed within the shell, a plurality of jacketed tube assemblies extending vertically within said reactor shell in a bundle formation with mutually-contacting top portions thereof being arranged such that an equilateral triangle is defined by lines interconnecting the central axes of three jacketed tube assemblies in mutual contact, each jacketed tube assembly including a sheathing tube and a reaction tube disposed within the sheathing tube to define an annular gap therebetween for conducting the medium undergoing said endothermic chemical reaction upwardly within said annular gap, each sheathing tube having six longitudinally-arranged slots uniformly distributed about the top end thereof, a connecting element welded to mutually-contacting sheathing tubes while extending along a slot in each sheathing tube, the connecting element having a face surface projecting into said annular gap within a sheathing tube to bear against the reaction tube, and means supported by said reactor shell to carry said jacketed tube assemblies in a bundle formation within said reactor shell.

2. The tubular reactor according to claim 1 wherein said means comprises a support ring surrounding the bundle formation of said jacketed tube assemblies at the top portion thereof, said support ring being connected to the jacketed tube assemblies which lie at the outer periphery of the bundle formation, said support ring including a support surface adapted to bear upon a shoulder defined by the layer of insulation within said reactor shell.

3. The tubular reactor according to claim 1 wherein the longitudinally-arranged slots in a sheathing tube are disposed along lines of mutual contact between said sheathing tubes, and wherein said connecting element includes spacer heads joined together by a web having longitudinal recesses in opposite sides, the width of each recess essentially corresponding to twice the wall thickness of a sheathing tube.

4. The tubular reactor according to claim 1 wherein the longitudinally-arranged slots in a sheathing tube are disposed midway between points of mutual contact between sheathing tubes, and wherein said connecting element includes a web having three spider arms each carrying a spacer head, both sides of each spider arm having longitudinal recesses defining a width corresponding to the wall thickness of a sheathing tube.

5. The tubular reactor according to claim 1 wherein the mutually-contacting top portions of the sheathing tubes each defines an external diameter, wherein a connecting element is welded thereto, which is greater than the external diameter of the sheathing tube extending beneath the connecting element.

6. The tubular reactor according to claim 1 further comprising sheet metal gussets welded to the sheathing tubes to form a gas-tight seal in the spaces between mutually-contacting sheathing tubes.

7. The tubular reactor according to claim 1 further comprising spacer members welded to the sheathing tubes below the mutually-contacting top portions thereof.

8. The tubular reactor according to claim 1 wherein said reaction tube extends beyond the upper terminal end of a sheathing tube of said plurality of jacketed tube assemblies, said tubular reactor further including support claws secured to the projecting portion of the reaction tubes for support by the upper terminal ends of the sheathing tubes.

9. The tubular reactor according to claim 8 wherein said support claws are constructed and arranged to position the reaction tube with respect to the sheathing tubes.

10. The tubular reactor according to claim 1 further comprising a catalytic means within said annular gap between a sheathing tube and a reaction tube.

* * * * *